(12) United States Patent
Isobe et al.

(10) Patent No.: US 11,514,341 B2
(45) Date of Patent: Nov. 29, 2022

(54) SYSTEMS AND METHODS FOR SPORTS DATA CROWDSOURCING AND ANALYTICS

(71) Applicant: Azra Analytics, Inc., Burbank, CA (US)

(72) Inventors: Jun Isobe, Harbor City, CA (US); Randa Reslan, Burbank, CA (US); Yang Hu, Irvine, CA (US)

(73) Assignee: Azra Analytics, Inc., Burbank, CA (US)

( * ) Notice: Subject to any disclaimer, the term of this patent is extended or adjusted under 35 U.S.C. 154(b) by 422 days.

(21) Appl. No.: 16/880,587

(22) Filed: May 21, 2020

(65) Prior Publication Data

US 2020/0372378 A1 Nov. 26, 2020

Related U.S. Application Data

(60) Provisional application No. 62/850,723, filed on May 21, 2019.

(51) Int. Cl.

| G06F 15/16 | (2006.01) |
|---|---|
| G06N 5/04 | (2006.01) |
| H04L 67/12 | (2022.01) |
| G06N 20/00 | (2019.01) |
| G06F 3/16 | (2006.01) |
| G10L 15/26 | (2006.01) |

(52) U.S. Cl.
CPC ............ *G06N 5/04* (2013.01); *G06F 3/165* (2013.01); *G06N 20/00* (2019.01); *G10L 15/26* (2013.01); *H04L 67/12* (2013.01)

(58) Field of Classification Search
CPC .......... G06N 5/04; G06N 20/00; H04L 67/12; G06F 3/165; G10L 15/26
USPC ........................................................ 709/200
See application file for complete search history.

(56) References Cited

U.S. PATENT DOCUMENTS

| 8,832,768 | B1 * | 9/2014 | Inzerillo | H04L 65/611 |
| | | | | 725/151 |
| 8,997,151 | B2 * | 3/2015 | Chai | H04N 21/47205 |
| | | | | 725/39 |
| 9,094,453 | B2 * | 7/2015 | Ady | H04L 67/51 |
| 9,393,485 | B2 | 7/2016 | Sullivan | |
| 9,704,340 | B2 * | 7/2017 | O'Brien | G07F 17/3272 |
| 10,043,341 | B1 * | 8/2018 | Joao | G07F 17/3244 |
| 10,477,254 | B1 * | 11/2019 | Yan | H04N 21/2187 |
| 10,638,182 | B2 * | 4/2020 | Kageyama | H04N 21/26291 |
| 10,832,530 | B2 * | 11/2020 | Katz | G07F 17/3272 |

(Continued)

*Primary Examiner* — Moustafa M Meky
(74) *Attorney, Agent, or Firm* — Chong IP Law Group

(57) ABSTRACT

Systems and methods for sports data crowdsourcing and analytics is provided. In one embodiment, a method for at least one server for generating verified sports data of a sporting event is provided, the method comprising: receiving, at the server(s), first audio data captured by a microphone of a first client device; receiving, at the server(s), second audio data captured by a microphone of a second client device; synching the first audio data by arranging the first audio data based on at least one parameter; synching the second audio data by arranging the second audio data based on the at least one parameter; and generating the verified sports data by comparing, based on the at least one parameter, the first audio data and the second audio data to determine that a stat within the sporting event is verified.

20 Claims, 11 Drawing Sheets

(56) References Cited

U.S. PATENT DOCUMENTS

| | | | |
|---|---|---|---|
| 11,172,248 B2* | 11/2021 | Schwartz | H04N 21/8133 |
| 2007/0212551 A1* | 9/2007 | Collins | C09J 163/00 |
| | | | 156/330 |
| 2011/0231289 A1* | 9/2011 | Liu | G06Q 50/34 |
| | | | 463/25 |
| 2015/0127710 A1* | 5/2015 | Ady | H04L 67/51 |
| | | | 709/202 |
| 2016/0214008 A1 | 7/2016 | Heck | |
| 2022/0148388 A1* | 5/2022 | Katz | G07F 17/329 |

* cited by examiner

SYSTEMS AND METHODS FOR SPORTS DATA CROWDSOURCING AND ANALYTICS

CROSS-REFERENCE TO RELATED APPLICATION

The current application claims priority to U.S. Provisional Patent Application No. 62/850,723, filed on May 21, 2019, the disclosure of which is incorporated herein by reference.

FIELD OF THE INVENTION

The present disclosure generally relates to data gathering, and more specifically to systems and methods for sports data crowdsourcing and analytics.

BACKGROUND

Many sports participants (may also be referred to "players") face difficulties in gaining exposure and accumulating verifiable data of their sporting abilities. For example, amateur players may find it hard to get the attention of organizations including, but not limited to, colleges. Further, recruiters at such organizations may face difficulties in obtaining quantitatively verifiable data of a player's sporting abilities.

SUMMARY OF THE INVENTION

The various embodiments of the present systems and methods for sports data crowdsourcing and analytics contain several features, no single one of which is solely responsible for their desirable attributes. Without limiting the scope of the present embodiments, their more prominent features will now be discussed below. After considering this discussion, and particularly after reading the section entitled "Detailed Description," one will understand how the features of the present embodiments provide the advantages described here.

One aspect of the present embodiments includes the realization that there is a need for tracking and/or gathering verifiable sports data (may be collectively referred to as "crowdsource-based scorekeeping"), including, but not limited to, players' statistics (may also be referred to as "stats"), game stats, game scores, etc. For instance, systems and methods, not in accordance with the current invention, require observers to gather information about a sporting event by tapping on icons on a client display, which may distract observers from carefully observing the ongoing competition. There is a need for an easier way for observers (may also be referred to as "users") to record sports data with accuracy while still being able to observe and enjoy the ongoing sporting event (may also be referred to as "sports event" or "exhibition"). Furthermore, sports data gathered by an individual stats keeper usually lack verifiability and confidence due to the existence of a single data set. The present embodiments solve these problems by allowing for multiple observers to provide information (e.g., sports data) while viewing a sporting event, thereby creating a plurality of data sets. In many embodiments, each of the multiple observers may provide inputs via voice and/or text to their individual client devices, as further described below. In various embodiments, the user inputs may be transmitted to one or more servers as complete or incomplete coverage of the sports event. In several embodiments, the server(s) may generate sports data by analyzing the users' observations, as further described below.

Another aspect of the present embodiments includes the realization that crowdsourcing data may allow for more accurate verifiable sports data. In some embodiments, various users may take on a particular scorekeeping role (e.g., shot chart input, play-by-play, etc.). In some embodiments, dictation or voice input may allow for real-time tabulation of sports statistics, even when the various users are casual sports viewers. In some embodiments, the various users may be presented with pre-populated rosters to reduce duplication of effort. Further, crowdsourcing may facilitate mass data collection where individual client devices and/or server(s) may perform Artificial Intelligence ("AI") based processes to combine role data and/or enable generation of more complete data sets with high confidence (e.g., verified sports data). In many embodiments, the verified sports data may be pushed to a display (e.g., a scoreboard, a jumbotron, etc.) at the venue for display during the sporting event. The present embodiments provide these advantages and enhancements, as further described below.

In a first aspect, a method for at least one server for generating verified sports data of a sporting event is provided, the method comprising: receiving, at the server(s), first audio data captured by a microphone of a first client device; receiving, at the server(s), second audio data captured by a microphone of a second client device; synching the first audio data by arranging the first audio data based on at least one parameter; synching the second audio data by arranging the second audio data based on the at least one parameter; and generating the verified sports data by comparing, based on the at least one parameter, the first audio data and the second audio data to determine that a stat within the sporting event is verified.

In an embodiment of the first aspect, the method further comprises processing the first audio data by converting the first audio data to first text data.

In another embodiment of the first aspect, the method further comprises processing the second audio data by converting the second audio data to second text data.

In another embodiment of the first aspect, the at least one parameter is a timestamp associated with a particular portion of the first audio data and a timestamp associated with a particular portion of the second audio data.

In another embodiment of the first aspect, the timestamp associated with the particular portion of the first audio data corresponds to a relative time that describes action that is occurring within the sporting event, and the timestamp associated with the particular portion of the second audio data corresponds to the relative time that describes the action that is occurring within the sporting event.

In another embodiment of the first aspect, the at least one parameter includes at least one of a team, a player, and a stat of interest.

In another embodiment of the first aspect, determining that the stat is verified when the first audio data matches the second audio data.

In another embodiment of the first aspect, the method further comprises: receiving, at the server(s), third audio data captured by a microphone of a third client device; synching the third audio data by arranging the third audio data based on the at least one parameter; and generating the verified sports data by comparing, based on the at least one parameter, the first audio data, the second audio data, and the third audio data to determine that the stat within the sporting event is verified.

In another embodiment of the first aspect, the first audio data and the second audio data are in conflict.

In another embodiment of the first aspect, the third audio data matches one of the first audio data and the second audio data, and wherein determining that the stat is verified is based on which of the first audio data and the second audio data is matched to the third audio data.

In a second aspect, a non-transitory machine readable storage medium is provided, the non-transitory machine readable storage medium storing a program comprising instructions that, when executed by at least one processor of a server, cause the server to perform operations including: receiving first text data from a first client device; receiving second text data from a second client device; synching the first text data by arranging the first text data based on at least one parameter; synching the second text data by arranging the second text data based on the at least one parameter; and-generating verified sports data by comparing, based on the at least one parameter, the first text data and the second text data to determine that a stat within a sporting event is verified.

In an embodiment of the second aspect, the at least one parameter is a timestamp associated with a particular portion of the first text data and a timestamp associated with a particular portion of the second text data.

In another embodiment of the second aspect, the timestamp associated with the particular portion of the first text data corresponds to a relative time that describes action that is occurring within the sporting event, and the timestamp associated with the particular portion of the second text data corresponds to the relative time that describes the action that is occurring within the sporting event.

In another embodiment of the second aspect, the at least one parameter includes at least one of a team, a player, and a stat of interest.

In another embodiment of the second aspect, the non-transitory machine readable storage medium further comprises instructions that, when executed by the at least one processor, further cause the server to determine that the stat is verified when the first text data matches the second text data.

In another embodiment of the second aspect, the non-transitory machine readable storage medium further comprises instructions that, when executed by the at least one processor, further cause the server to determine that the stat is in conflict.

In another embodiment of the second aspect, the non-transitory machine readable storage medium further comprises instructions that, when executed by the at least one processor, further cause the server to compare the first text data and the second text data using an iterative process.

In another embodiment of the second aspect, the iterative process comprises using training data and making at least one prediction.

In another embodiment of the second aspect, the non-transitory machine readable storage medium further comprises instructions that, when executed by the at least one processor, further cause the server to: receive third text data from a third client device; synch the third text data by arranging the third text data based on the at least one parameter; and generate the verified sports data by comparing, based on the at least one parameter, the first text data, the second text data, and the third text data to determine that the stat within the sporting event is verified.

In another embodiment of the second aspect, the non-transitory machine readable storage medium further comprises instructions that, when executed by the at least one processor, further cause the server to determine that the first text data and the second text data are in conflict, and determine that the stat is verified when the third text data matches one of the first text data and the second text data.

DETAILED DESCRIPTION OF THE DRAWINGS

Figure 1:
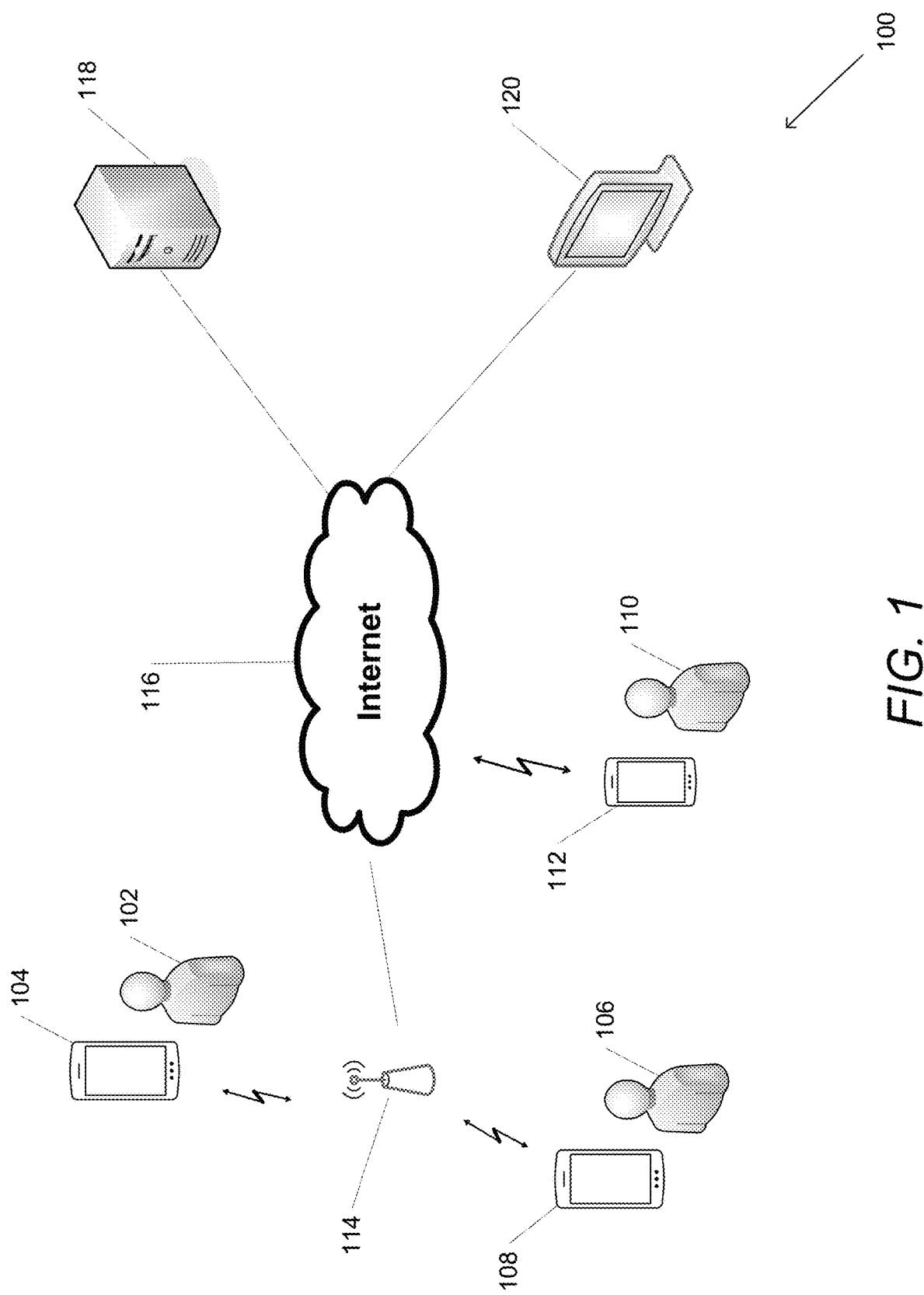
FIG. 1 is a system diagram illustrating a crowdsource-based scorekeeping system.

The following detailed description describes the present embodiments with reference to the drawings. In the drawings, reference numbers label elements of the present embodiments. These reference numbers are reproduced below in connection with the discussion of the corresponding drawing features.

Turning now to the drawings, systems and methods for sports data crowdsourcing and analytics in accordance with embodiments of the invention are disclosed. In many embodiments, a crowdsource-based scorekeeping system may include one or more observers that may provide sports data about a sports event taking place at a venue. For example, observers may be watching the sports event in real-time and providing sports data (e.g., audio and/or text inputs) of what the observers are witnessing. In other embodiments, observers may be watching a recorded version of the sports event later in time from when the event occurred and providing sports data. In various embodiments, the observers may be watching the sports event in-person and/or as a video feed and/or recording. In many embodiments, the observers may send the sports data to a server using their client devices, as further described below. In various embodiments, the server may receive the crowdsourced sports data and perform various processes to generate verified sports data (e.g., box scores, player stats, and/or game stats), as further described below. In some embodiments, the server may transmit the verified sports data to one or more of the client devices. In some embodiments, the server may transmit the verified sports data to the venue where it may be presented on a display device (e.g., scoreboard) at the venue. In many embodiments, the verified sports data may be utilized for various sports analytics including, but not limited to, creating player profiles, rankings, and/or any other measure of a player's sporting abilities. Crowdsource-based scorekeeping systems in accordance with embodiments of the invention are further described below.

Crowdsource-Based Scorekeeping Systems

Crowdsource-based scorekeeping systems in accordance with embodiments of the invention may be used to accurately track scores, players' stats, and/or game stats. In many embodiments, various users may use a client device to provide observations of a sports event using voice inputs describing the action in the sports event. In various embodiments, the voice inputs may be transmitted to one or more servers and processed to generate verified sports data, as further described below. In several embodiments, the crowdsource-based scorekeeping system may be a platform that includes providing incentives to the various users for providing their observations. For example, the platform may include a server that generates and/or distributes tokens, such as, but not limited to, cryptocurrency to the various users. Further, the platform may include various other features, such as, but not limited to, social media, reality gaming (e.g., gaming based on reality experiences such as, but not limited to, virtual reality gaming, augmented reality gaming, games implementing evolving real-world statistics, etc.), marketplace, auctions, sports data analytics, etc. For example, in some embodiments, the cryptocurrency may be used with the platform as a virtual currency by the users in interacting with the various features.

A system diagram illustrating a crowdsource-based scorekeeping system in accordance with an embodiment of the invention is shown in FIG. 1. A crowdsource-based scorekeeping system 100 may include a first user 102 on a first client device 104 and a second user 106 on a second client device 108. In many embodiments, the first user 102 and the second user 106 may be observing a sports event at a venue. In other embodiments, the first and second users 102, 106 may be observing the sports event via a live feed or as a recorded event. In some embodiments, the system 100 may also include additional users on additional client devices, such as, but not limited to, a third user 110 on a third client device 112. In various embodiments, the system 100 may include any number of users each having their own client device so long as each user is viewing the same sports event. In many embodiments, the client device(s) 104, 108, 112 may include various electronic devices that may receive a user's voice input, such as, but not limited to, a cellular phone, laptop computer, smart phone, and/or tablet computer.

In further reference to FIG. 1, the client devices 104, 108, 112 may be connected to and have access to the Internet 116 in a manner known to one of ordinary skill in the art. For example, the first client device 104 and the second client device 108 may access the Internet 116 via a wireless access point 114, such as, but not limited to, Wi-Fi. Further, the third client device 112 may access the Internet 116 using a cellular network. In some embodiments, the client devices 104, 108, 112 may have access to the Internet 116 while observing the sports event. In other embodiments, the client devices 104, 108, 112 may have access to the Internet 116 at some time after recording (e.g., via voice and/or text) their observations, as further described below.

In further reference to FIG. 1, the first, second, and/or third users 102, 106, 110, may utilize their client device(s) 104, 108, 112, respectively, to provide information of their observations of the sports event, as further described below. For example, the client device(s) 104, 108, 112 may include a graphic user interface ("GUI") that allows the user(s) to input various observations. In some embodiments, the client device(s) 104, 108, 112, may include one or more microphones for receiving voice inputs from the user(s) 102, 106, 110, respectively. For example, the first user 102 may provide observations using natural language describing the action that the first user 102 is witnessing. For example, the first user 102 may input "number 23 scores a 3-pointer." Likewise, the second user 106 may input sports data using natural language describing the action that the second user 106 is also witnessing. For example, the second user 106 may input "number 8 makes a free throw." Similarly, the third user 110 may input sports data using natural language describing the action that the third user 110 is witnessing. For example, the second user 106 may input "number 8 misses second free throw." In many embodiments, the users 102, 106, 110 may be observing the sports event independently, and their observations would not be coordinated. In other words, each user may be providing information corresponding to overlapping events or corresponding to non-overlapping events in the sports event. In several embodiments, the various users (e.g., first user 102, second user 106, and/or third user 110) may transmit their observations to a server 118, where such crowdsource-based information may be used by the server 118 to test and verify the sports data, as further described below. Although three client devices 104, 108, and 112 are illustrated in FIG. 1, any number of client devices (and any number of users) as appropriate to the requirements of a specification application may be utilized in accordance with embodiments of the invention. In many embodiments, the accuracy of the verified sports data becomes higher as more users participate in the crowdsource-based scorekeeping system 100.

In further reference to FIG. 1, the client device(s) 104, 108, 112 may provide location data, such as, but not limited to, Global Positioning System (GPS) data, to the server 118. In such embodiments, the server 118 may use the location data in processing any other data received from the client device(s) 104, 108, 112, as further described below. In several embodiments, the server 118 may transmit the verified sports data and/or any other data (e.g., user data, location data, etc.) to the client device(s) 104, 108, 112 and/or a display device 120. In some embodiments, the display device 120 may be a screen in a particular venue which allows for concurrent viewing of the verified sports data by people present at the venue. In many embodiments, the display device 120 may be a scoreboard. In other embodiments, the display device 120 may be a personal device (e.g., a client device) that an individual may observe. While the crowdsource-based scorekeeper system 100 is shown including exemplary devices, a person skilled in the art would recognize that the invention is not limited to the devices shown in FIG. 1 and may include additional types of devices.

Figure 2:
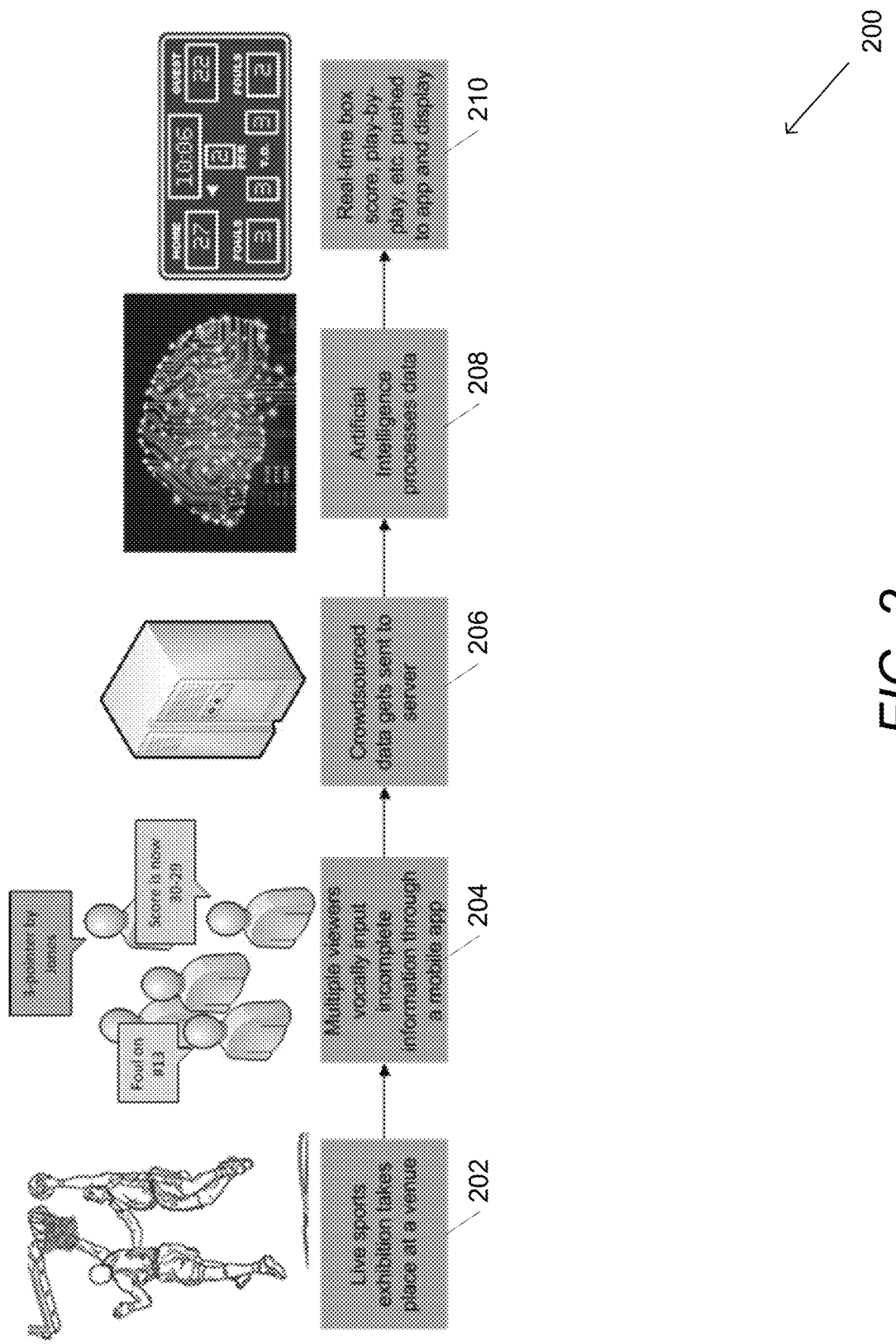
FIG. 2 is a diagram illustrating a process for crowdsource-based scorekeeping in accordance with an embodiment of the invention.

A diagram illustrating a process for a crowdsource-based scorekeeping method in accordance with an embodiment of the invention is illustrated in FIG. 2. The crowdsource-based scorekeeping process 200 may include various users (may also be referred to as "scorers" or "observers") observing (202) a live sports event (e.g., basketball game) taking place at a venue. The various users may utilize their client devices to vocally input (204) their observations (may also be referred to as "scorekeeper data"), as further described below. In other embodiments, the users may provide observations via a keyboard or touchscreen. In many embodiments, the observations may be complete or incomplete. As further described below, greater confidence of the verified sports data is achieved with more users. For example, 10-15 users may provide 90% or more coverage of the event.

In further reference to FIG. 2, the client device(s) may transmit (206) the scorekeeper data to a server. In many embodiments, the client device(s) may also transmit (206) other data (e.g., location data, user data, etc.) in addition to the scorekeeper data to the server. Upon receiving the scorekeeper data from the one or more client devices, the server may process and verify (208) the data, thereby generating box scores, player stats, and/or game stats, as further described below. For example, the server may utilize artificial intelligence processes using the scorekeeper data and/or other data. For example, the server may take into account that similarly timed observations are more likely of the same event or the same action in the event. In some embodiments, the server may generate a training data set for further verifying data. The process 200 may also include transmitting (210) the verified sports data from the server to client device(s) and/or display devices, as further described below. Client devices and servers for crowdsource-based scorekeeping systems in accordance with embodiments of the invention are discussed further below.

Client Devices in a Crowdsource-Based Scorekeeping System

Figure 3:
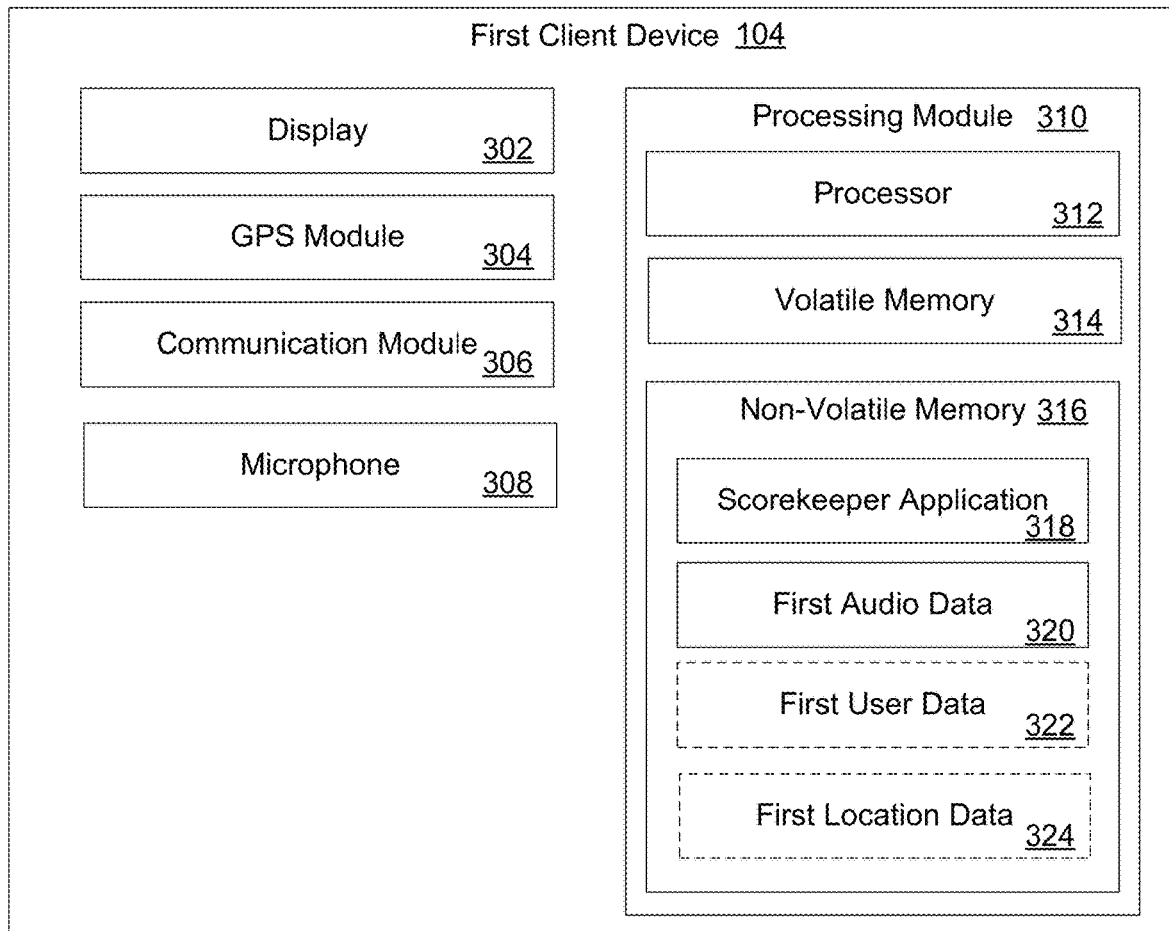
FIG. 3 is a block diagram illustrating a first client device in accordance with an embodiment of the invention.

Various devices may be used in a crowdsource-based scorekeeping system. A block diagram illustrating a first client device 104 in accordance with an embodiment of the invention is shown in FIG. 3. The first client device 104 may include a display 302, a GPS module 304, a communication module 306, and a microphone 308. In many embodiments, the first client device 104 may also include a processing module 310 that may include a processor 312, a volatile memory 314, and a non-volatile memory 316. In various embodiments, the non-volatile memory 316 may include a scorekeeper application 318 that allows the first client device 104 to capture first audio data 320 using the microphone 308. As described herein, a microphone may also include earphones, headsets, and/or any other device configurable to capture audio data. In various embodiments, the scorekeeper application 318 may include speech-to-text-conversion capability. The scorekeeper application 318, when executed by the processor 312, may provide for interfaces, uploads, downloads, and/or data functionality to support crowdsource-based scorekeeping systems. In several embodiments, the first client device 104 may transmit the first audio data 320 to one or more servers for processing, as further described below. In many embodiments, the first audio data 320 may describe the sports event and may be entered by voice input via the microphone 308 of the first client device 104. For example, the first audio data 320 may include a voice input stating, "scores a 3 pointer." The description need not necessarily be complete to be used in the crowdsource-based scorekeeping system. For example, even if the first audio data 320 entered by the first user is incomplete (e.g., discusses 3 points being scored but fails to cite the player's name), it may still be pieced together with a plurality of audio data from a plurality of users (e.g., a second user of a second client device 108) by a server, as further described below. In many embodiments, each voice input that is saved as the first audio data 320 may be timestamped to aid in processing by the server in verifying sports data, as further described below.

In reference to FIG. 3, the non-volatile memory 316 may also store first user data 322 and/or first location data 324. In many embodiments, the GPS module 304 may be utilized to gather first location data 324 such as, but not limited to, a location of the first client device 104 and/or location of a sports event. In some embodiments, the display 302 may be used to receive an input from the first user of the location of the first client device 104 and/or location of a sports event which may be saved as the first location data 324 in the non-volatile memory 316 of the first client device 104. In some embodiments, the display 302 may provide a virtual map to assist in determining a location, which may be used to designate the location of the sports event and/or activity locations within the sports event. The first location data 324 may also be used in some embodiments to evaluate the confidence of the data by cross-referencing with frequency of reports and users associated with the reporting.

In further reference to FIG. 3, the first user data 322 may include various data associated with the first user such as, but not limited to, personal identification information, banking information, login information, payment history information, etc. For example, the first user data 322 may include user related information, including user name, date of birth, phone number, record of misreporting, frequency of reporting, etc. In many embodiments, the first user data 322 may be inputted by the first user using a touch interface or a keypad interface. In various embodiments, the first user data 322 and/or the first location data 324 may be transmitted to the server using the communication module 306.

Figure 6:
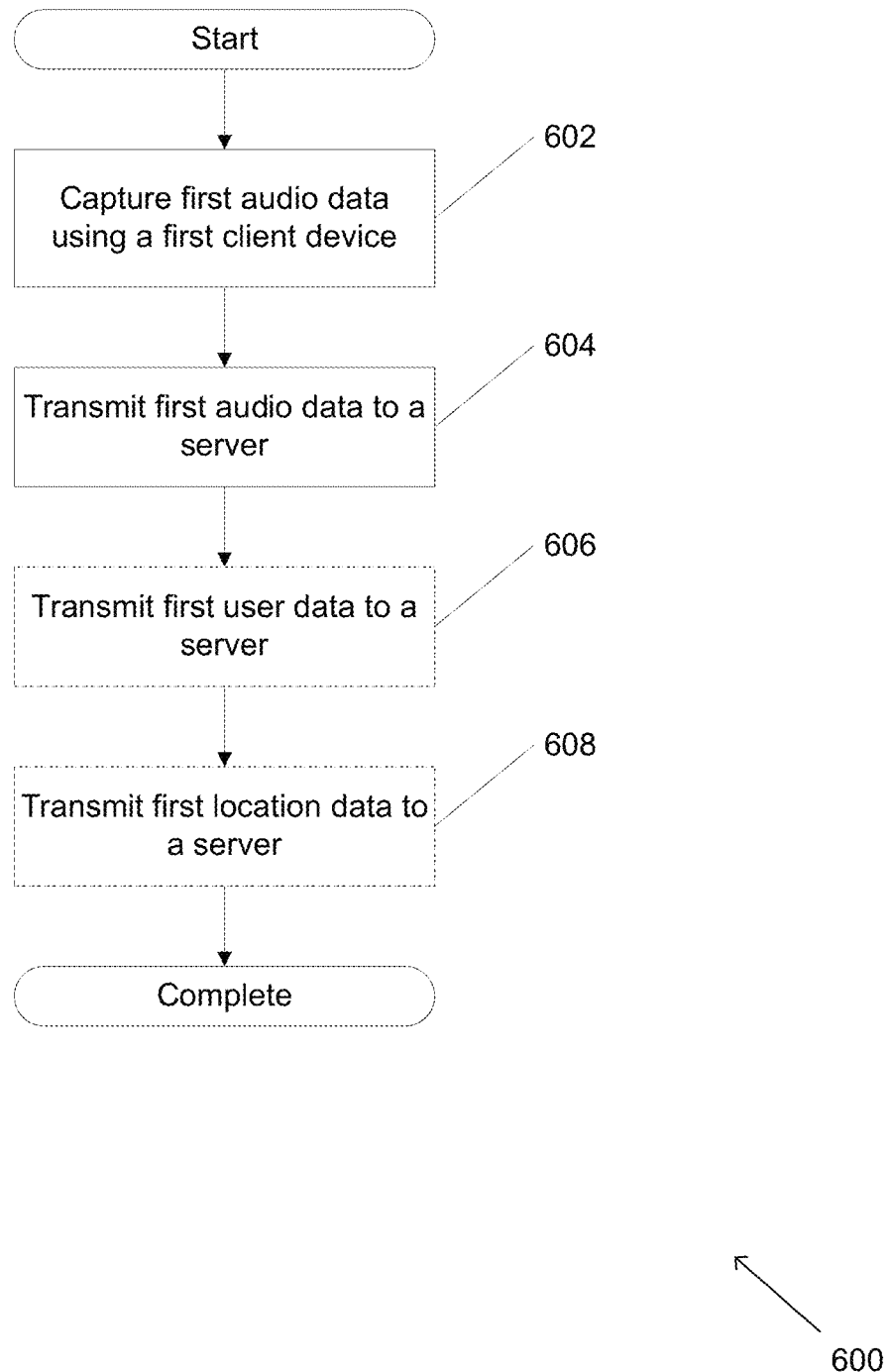
FIG. 6 is a flowchart illustrating a process for capturing first audio data in accordance with an embodiment of the invention.

A flow chart illustrating a process 600 for gathering first audio data 320 using a first client device 104 is shown in FIG. 6. In many embodiments, the first user may download and launch the scorekeeper application 318 on the first client device 104 using various methods known to one of ordinary skill in the art. In various embodiments, the scorekeeper application 318 may provide a platform for the first user to interact with one or more servers in sports data crowdsourcing and analytics, as further described below. In several embodiments, the first user may provide first user data 322 using the first client device 104, as described above.

In reference to FIG. 6, the process 600 may include capturing first audio data 320 using a microphone 308 of the first client device 104. For example, a first user may be observing a sports event and provide voice inputs of his or her observations which may be captured by the microphone 308 and stored in the non-volatile memory 316. In some embodiments, the first client device 104 may also capture text input using a variety of input methods that describes the first user's observations. In some embodiments, the text input may be stored as text data in the non-volatile memory 316. In various embodiments, the first audio data 320 may be converted to text data by the first client device 104. In other embodiments, the first audio data 320 may be converted to text data by the servers, as further described below. The process 600 may also include transmitting (604) the first audio data 320 to a server (e.g., server 118) using the communication module 306. The first audio data 320 may be transmitted (604) to the server at various times. For example, the first client device 104 may transmit (604) the first audio data 320 when an Internet connection is available. In some embodiments, the first client device 104 may transmit (604) the first audio data 320 after the first user has completed his or her observations. In some embodiments, the first client device 104 may transmit (604) the first audio data 320 during a pause in voice inputs from the first user. In some embodiments, the first audio data 320 may be transmitted (604) upon the first user providing a command to transmit the first audio data 320 or the first user closing the scorekeeper application 318.

In further reference to FIG. 6, the process 600 may further include transmitting (606) the first user data 322 and/or transmitting (608) the first location data 324 using the communication module 306. Similar to transmitting (604) the first audio data 320, the first user data 322 and/or the first location data 324 may be transmitted (606, 608) to the server at various times. For example, the first client device 104 may transmit (606, 608) the first user data 322 and/or the first location data 324 when an Internet connection is available. In some embodiments, the first client device 104 may transmit (606, 608) the first user data 322 and/or the first location data 324 after the first user has completed his or her observations. In some embodiments, the first client device 104 may transmit (604) the first audio data 320 during a pause in voice inputs from the first user. In some embodiments, the first user data 322 and/or the first location data 324 may be transmitted (606, 608) upon the first user providing a command to transmit the first user data 322 and/or the first location data 324. In some embodiments, the first user data 322 and/or the first location data 324 may be transmitted (606,608) when the first user closes the scorekeeper application 318. Although a specific process for gathering audio data using a first client device is discussed above with respect to FIG. 6, any of a variety of processes for gathering various data as appropriate to the requirements of a specific application may be utilized in accordance with embodiments of the invention.

Figure 4:
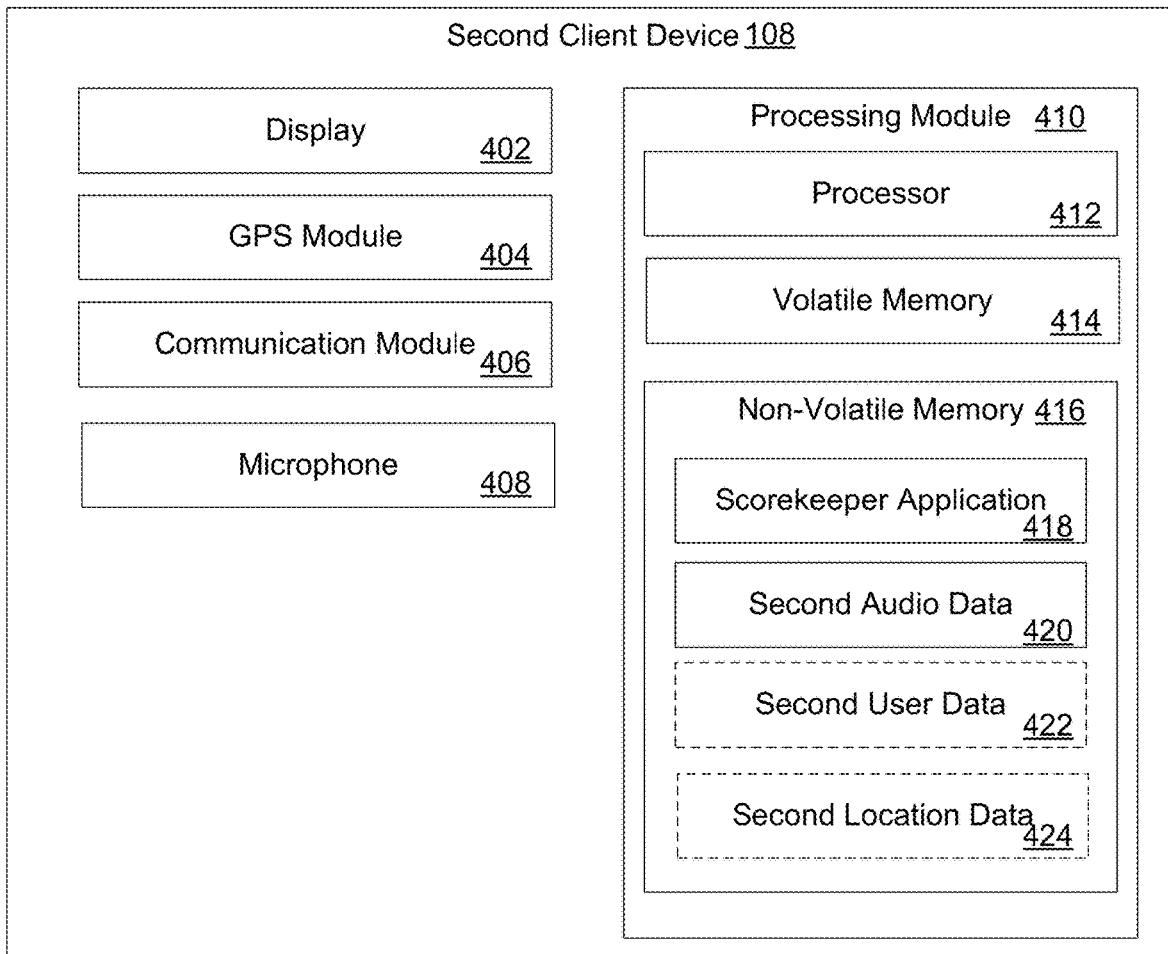
FIG. 4 is a block diagram illustrating a second client device in accordance with an embodiment of the invention.

A crowdsource-based scorekeeping system typically includes one or more client devices operated by one or more users observing the same sports event. A block diagram illustrating a second client device 108 in accordance with an embodiment of the invention is shown in FIG. 4. The second client device 108 may include a display 402, a GPS module 404, a communication module 406, and a microphone 408. In many embodiments, the second client device 108 may also include a processing module 410 that may include a processor 412, a volatile memory 414, and a non-volatile memory 416. In various embodiments, the non-volatile memory 416 may include a scorekeeper application 418 that allows the second client device 108 to capture second audio data 420 using the microphone 408. The scorekeeper application 418, when executed by the processor 412, may provide for interfaces, uploads, downloads, and/or data functionality to support crowdsource-based scorekeeping systems. In several embodiments, the second client device 108 may transmit the second audio data 420 to one or more servers for processing, as further described below. In many embodiments, the second audio data 420 may describe the sports event and may be entered by voice input via the microphone 408 of the second client device 108. For example, the second audio data 420 may include a voice input stating, "scores a 2 pointer." The description need not necessarily be complete to be used in the crowdsource-based scorekeeping system. For example, even if the second audio data 420 entered by the second user is incomplete (e.g., discusses 2 points being scored but fails to cite the player's name), it may still be pieced together with a plurality of audio data from a plurality of users (e.g., a first user of a first client device 104) by a server, as further described below. In many embodiments, each voice input that is saved as the second audio data 420 may be timestamped to aid in processing by the server in verifying sports data, as further described below.

In reference to FIG. 4, the non-volatile memory 416 may also store second user data 422 and/or second location data 424. In many embodiments, the GPS module 404 may be utilized to gather second location data 424 such as, but not limited to, a location of the second client device 108 and/or location of a sports event. In some embodiments, the display 402 may be used to receive an input from the second user of the location of the second client device 108 and/or location of a sports event which may be saved as the second location data 424 in the non-volatile memory 416 of the second client device 108. In some embodiments, the display 402 may provide a virtual map to assist in determining a location, which may be used to designate the location of the sports event and/or activity locations within the sports event. The second location data 424 may also be used in some embodiments to evaluate the confidence of the data by cross-referencing with frequency of reports and users associated with the reporting.

In further reference to FIG. 4, the second user data 422 may include various data associated with the second user, such as, but not limited to, personal identification information, banking information, login information, payment history information, etc. For example, the second user data 422 may include user related information, including user name, date of birth, phone number, record of misreporting, frequency of reporting, etc. In many embodiments, the second user data 422 may be inputted by the second user using a touch interface or a keypad interface. In various embodiments, the second user data 422 and/or the second location data 424 may be transmitted to the server using the communication module 406.

Figure 7:
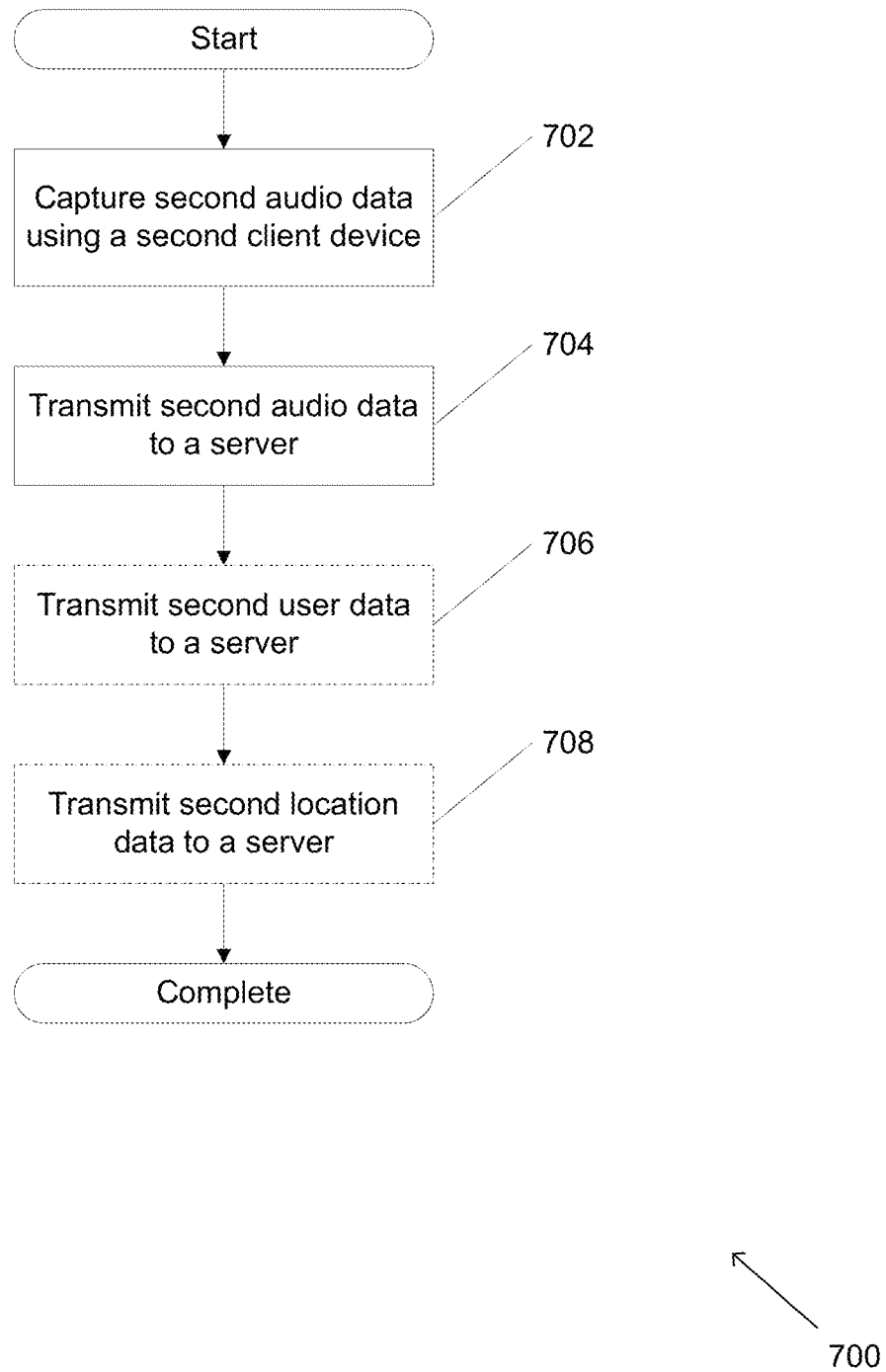
FIG. 7 is a flowchart illustrating a process for capturing second audio data in accordance with an embodiment of the invention.

A flow chart illustrating a process 700 for gathering second audio data 420 using a second client device 108 is shown in FIG. 7. In many embodiments, the second user may download and launch the scorekeeper application 418 on the second client device 108 using various methods known to one of ordinary skill in the art. In various embodiments, the scorekeeper application 418 may provide a platform for the second user 106 to interact with one or more servers in sports data crowdsourcing and analytics, as further described below. In several embodiments, the second user may provide second user data 422 using the second client device 108, as described above.

In reference to FIG. 7, the process 700 may include capturing second audio data 420 using a microphone 408 of the second client device 108. For example, a second user may be observing a sports event and provide voice inputs of his or her observations which may be captured by the microphone 408 and stored in the non-volatile memory 416. In some embodiments, the second client device may also capture text input using a variety of input methods that describes the second user's observations. In some embodiments, the text input may be stored as text data in the non-volatile memory 416. In various embodiments, the second audio data 420 may be converted to text data by the second client device 108. In other embodiments, the second audio data 420 may be converted to text data by the servers, as further described below. The process 700 may also include transmitting (704) the second audio data 420 to a server (e.g., server 118) using the communication module 406. The second audio data 420 may be transmitted (704) to the server at various times. For example, the second client device 108 may transmit (704) the second audio data 420 when an Internet connection is available. In some embodiments, the second client device 108 may transmit (704) the second audio data 420 after the second user has completed his or her observations. In some embodiments, the second client device 108 may transmit (704) the second audio data 420 during a pause in voice inputs from the second user. In some embodiments, the second audio data 420 may be transmitted (704) upon the second user providing a command to transmit the second audio data 420 or the second user closing the scorekeeper application 418.

In further reference to FIG. 7, the process 700 may further include transmitting (706) the second user data 422 and/or transmitting (708) the second location data 424 using the communication module 406. Similar to transmitting (704) the second audio data 420, the second user data 422 and/or the second location data 424 may be transmitted (706, 708) to the server at various times. For example, the second client device 108 may transmit (706, 708) the second user data 422 and/or the second location data 424 when an Internet connection is available. In some embodiments, the second client device 108 may transmit (706, 708) the second user data 422 and/or the second location data 424 after the second user has completed his or her observations. In some embodiments, the second client device 108 may transmit (704) the second audio data 420 during a pause in voice inputs from the second user. In some embodiments, the second user data 422 and/or the second location data 424 may be transmitted (706, 708) upon the second user providing a command to transmit the second user data 422 and/or the second location data 424. In some embodiments, the second user data 422 and/or the second location data 424 may be transmitted (706, 708) when the second user closes the scorekeeper application 418. Although a specific process for gathering audio data using a second client device is discussed above with respect to FIG. 7, any of a variety of processes for gathering various data as appropriate to the requirements of a specific application may be utilized in accordance with embodiments of the invention.

In reference to FIGS. 3-4, the various components including (but not limited to) the processing modules 310, 410 are represented by separate boxes. The graphical representations depicted in each of FIGS. 3-4 are merely examples and are not intended to indicate that any of the various components of the first client device 104, and/or the second client device 108 are necessarily physically separate from one another, although in some embodiments they might be. In some embodiments, however, the structure and/or functionality of any or all components of the first client device 104 and/or second client device 108 may be combined. In some embodiments, the processors 312, 412 may include, but is not limited to, any generic processing unit capable of performing computations. The volatile memories 314, 414 may include, but is not limited to, Randomly Accessed Memory (RAM) or another comparable form of rapid storage. Non-volatile memories 316, 416 may include, but is not limited to, any memory type that retains storage of data after powering down. In addition, in some embodiments, the communication modules 306, 406 may include their own processors, volatile memories, and/or non-volatile memories. In addition, the communication modules 306, 406 may comprise, but are not limited to, one or more transceivers and/or wireless antennas (not shown) configured to transmit and receive wireless signals such as (but not limited to) satellite, radio frequency (RF), Bluetooth or WIFI. In other embodiments, the communication modules 306, 406 may comprise (but are not limited to) one or more transceivers configured to transmit and receive wired signals. Although specific client devices for crowdsource-based scorekeeping systems are discussed above with respect to FIGS. 3-4, any of a variety of client devices as appropriate to the requirements of a specific application may be utilized in accordance with embodiments of the invention. Servers for crowdsource-based scorekeeping systems in accordance with embodiments of the invention are discussed further below.

Servers in a Crowdsource-Based Scorekeeping System

Figure 5:
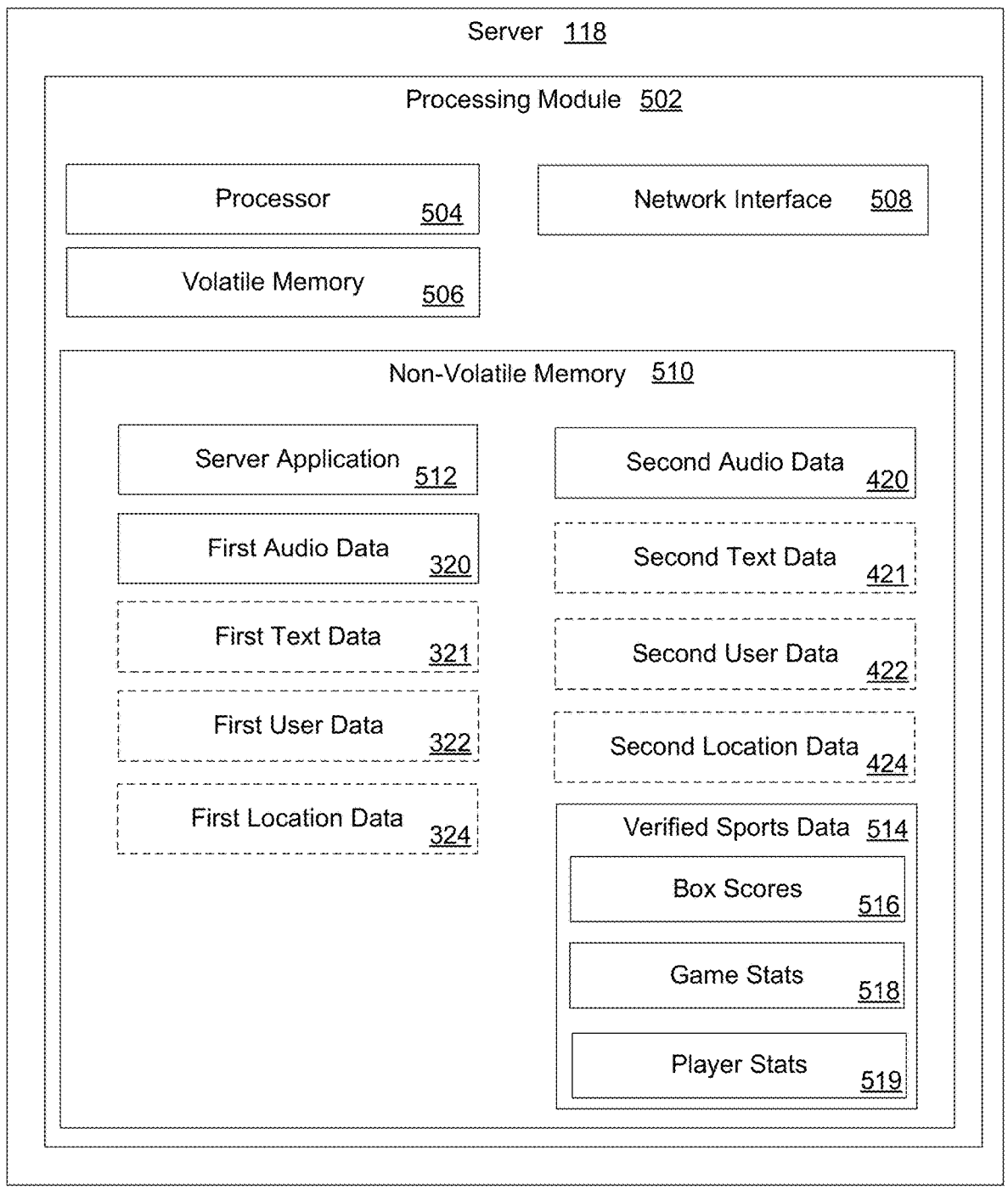
FIG. 5 is a block diagram illustrating a server in accordance with an embodiment of the invention.

Crowdsource-based scorekeeping systems may be implemented across various devices. These devices may each perform different tasks in different embodiments. For example, a server may receive audio data, user data, and/or location data, and generate verified sports data. A block diagram illustrating a server 118 in accordance with an embodiment of the invention is shown in FIG. 5. The server 118 may include a processing module 502 that comprises a processor 504, a volatile memory 506, network interface 508, and a non-volatile memory 510. In many embodiments, the non-volatile memory 510 may include a server application 512 that configures the processor 504 to process and provide verified sports data 514, as further described below. The server 118 may also be configured to receive, from the first client device 104, first audio data 320, first text data 321, first user data 322, and/or first location data 324 using the network interface 508, as further described below. Further, the server 118 may also be configured to receive, from the second client device 108, second audio data 420, second text data 421, second user data 422, and/or second location data 424, as further described below. In many embodiments, the server 118 may be configured to receive, from various additional client devices, audio data, text data, user data, and/or location data.

In further reference to FIG. 5, the server 118 may be configured to generate verified sports data 514 using the received data from the first client device 104 and second client device 108 (and other client device(s) such as, but not limited to, the third client device 112). For example, the server 118 may utilize various processes, such as, but not limited to, machine learning processes for using the first audio data 320 and the second audio data 420 (or any additional audio data) to generate verified sports data 514, including, but not limited to, box scores 516, game stats 518 and/or player stats 519, as further described below. In some embodiments, the box scores 516 may be a structured summary of the results from a sports event. For example, the box score 516 may list the game stats 518 and/or the individual player stats 519. In many embodiments, the verified sports data 514 may comprise processed results from the plurality of audio data (e.g., first audio data 320, second audio data 420, etc.) and/or text data (e.g., first text data 321, second text data 421, etc.), as further described below. In many embodiments, the verified sports data 514 may be number-based and/or include additional non-number-based information relevant and be pertinent to a description of a sporting event, as further described below.

In reference to FIG. 5, the various components, including (but not limited to) the processing module 502, are represented by separate boxes. The graphical representations depicted in FIG. 5 are merely examples and are not intended to indicate that any of the various components of the server 118 are necessarily physically separate from one another, although in some embodiments they might be. In some embodiments, however, the structure and/or functionality of any or all components of the server 118 may be combined. In addition, in some embodiments the network interface 508 may include its own processor, volatile memory, and/or non-volatile memory. In addition, the network interface 508 may comprise, but is not limited to, one or more transceivers and/or wireless antennas (not shown) configured to transmit and receive wireless signals such as (but not limited to) satellite, radio frequency (RF), Bluetooth or WIFI. In other embodiments, the network interface 508 may comprise (but is not limited to) one or more transceivers configured to transmit and receive wired signals. Although specific servers for crowdsource-based scorekeeping systems are discussed above with respect to FIG. 5, any of a variety of servers as appropriate to the requirements of a specific application may be utilized in accordance with embodiments of the invention.

Figure 8:
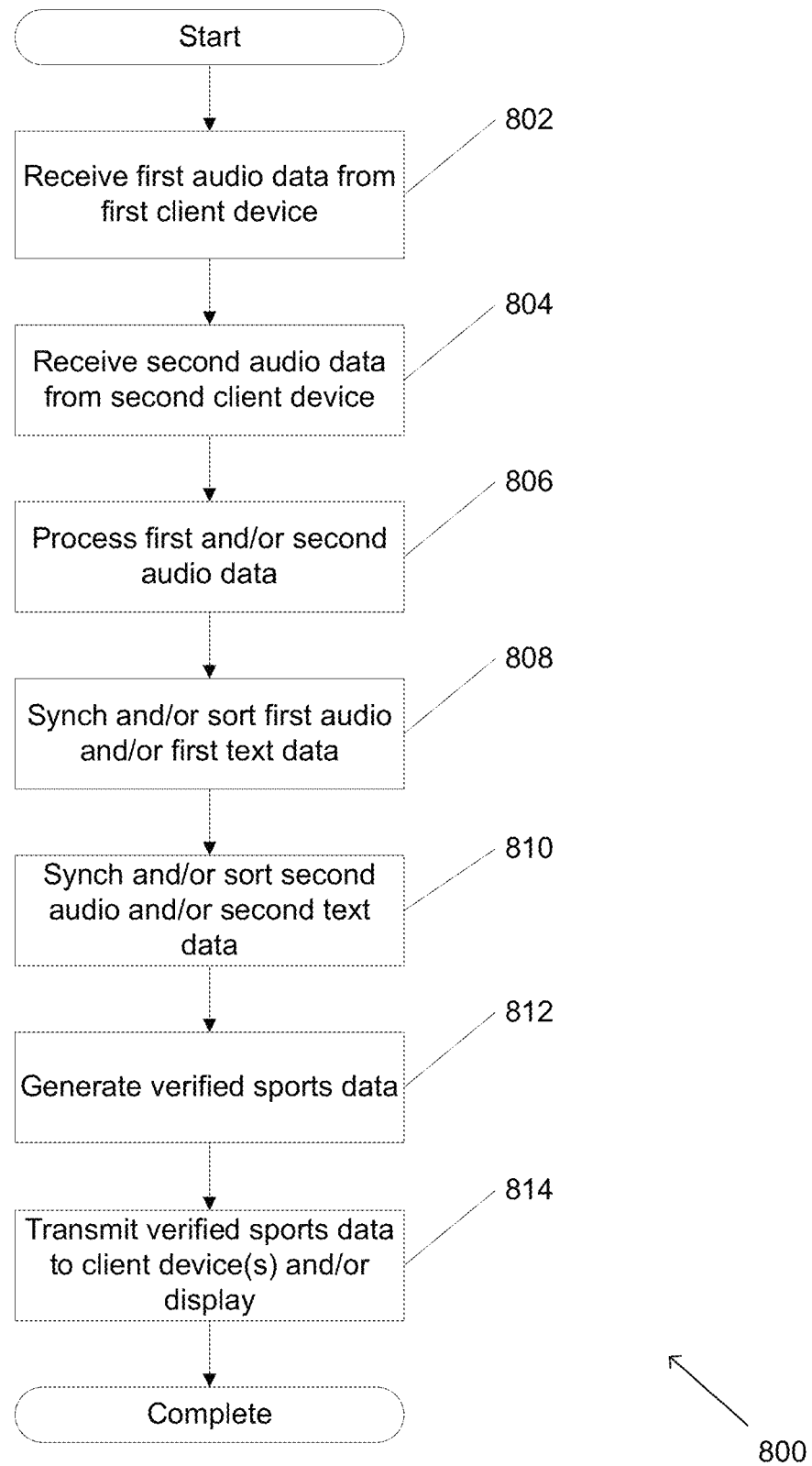
FIG. 8 is a flowchart illustrating a process for providing verified data in accordance with an embodiment of the invention.

A flow chart illustrating a process 800 for providing verified sports data in accordance with an embodiment of the invention is shown in FIG. 8. The process 800 may include receiving (802) first audio data 320 from the first client device 104 using the network interface 508. In some embodiments, the process 800 may also include receiving the first user data 322 and/or the first location data 324 from the first client device 104. The process 800 may also include receiving (804) the second audio data 420 from the second client device 108 using the network interface 508. In some embodiments, the process 800 may further include receiving the second user data 422 and/or the second location data 424 from the second client device 108. In various embodiments, the server 118 may receive first text data 321 and/or second text data 421 from the first client device 104 and/or the second client device 108, respectively. The process 800 may also include processing (806) the first and/or second audio data 320, 420 for data analysis. For example, the server 118 may process (806) by converting the first audio data 320 into first text data 321 and/or converting the second audio data 420 into second text data 421. By converting the audio data 320, 420 to text data 321, 421, the server 118 may more readily handle the data and perform various processes on the data. In some embodiments, where the audio data comprises a plurality of voice inputs, the server 118 may extract or identify between different voices by identifying the voice closest to the client device and/or via usage of user data (e.g., voice recognition). Likewise, in some embodiments, particular phrases commonly used in a particular type of sporting event or locality may be recognized and learned by the server 118 (e.g., via machine learning) for processing of the various data. In another example, the server 118 may process (806) by associating the first audio data 320 and/or the first text data 321 with the first user data 322 and/or the first location data 324. Likewise, the server 118 may process (806) by associating the second audio data 420 and/or the second text data 421 with the second user data 422 and/or the second location data 424. By associating the user and location data, the server 118 may more readily handle the data and perform various processes on the data.

In reference to FIG. 8, the process 800 may also include synching and/or sorting (808) the first audio data 320 and/or the first text data 321 to arrange the data 320, 321. For example, the first audio data 320 and/or first text data 321 may be chronologically ordered based on a timestamp associated with a particular portion of the first audio data 320 and/or first text data 321. In some embodiments, the timestamp may correspond to when a user provided the input describing the action that he or she witnessed. In other embodiments, the timestamp may correspond to content within the first audio data 320 and/or first text data 321 that describes a relative time that the described action is happening within the sports event. For example, the first user may verbally state a relative time (e.g., "first quarter," "10-minute mark," etc.) in providing his or her voice inputs. Although described as synching and/or sorting (808) chronologically, the first audio data 320 and/or the first text data 321 may be synched and/or sorted (808) in a variety of ways as appropriate to the requirements of a specific application. For example, the first audio data 320 and/or the first text data 321 may be synched and/or sorted (808) based on one or more parameters, such as, but not limited to, a particular team, a player, a stat of interest, etc.

In further reference to FIG. 8, the process 800 may also include synching and/or sorting (810) the second audio data 420 and/or the second text data 421 to arrange the data 420, 421. For example, the second audio data 420 and/or second text data 421 may be chronologically ordered based on a timestamp associated with a particular portion of the second audio data 420 and/or second text data 421. In some embodiments, the timestamp may correspond to when a user provided the input describing the action that he or she witnessed. In other embodiments, the timestamp may correspond to content within the second audio data 420 and/or second text data 421 that describes a relative time that the described action is happening within the sports event. For example, the second user may verbally state a relative time (e.g., "third quarter," "5 minutes remaining," etc.) in providing his or her voice inputs. Although described as synching and/or sorting (810) chronologically, the second audio data 420 and/or the second text data 421 may be synched and/or sorted (810) in a variety of ways as appropriate to the requirements of a specific application. For example, the second audio data 420 and/or the second text data 421 may be synched and/or sorted (810) based on one or more parameters, such as, but not limited to a particular team, a player, a stat of interest, etc.

In further reference to FIG. 8, the process 800 may also include generating (812) verified sports data 514, such as, but not limited to, box scores 516, game stats 518, and/or player stats 519, as further described below. For example, the process 800 may include generating (812) verified sports data 514 by analyzing the first audio data 320 (and/or first text data 321) relative to the second audio data 420 (and/or second text data 421), as further described below. In addition, the process 800 may include transmitting (814) the verified sports data 514 to one or more client devices (e.g., first client device 104, second client device 108, third client device 112, etc.) and/or a display 120, as described above.

Figure 9:
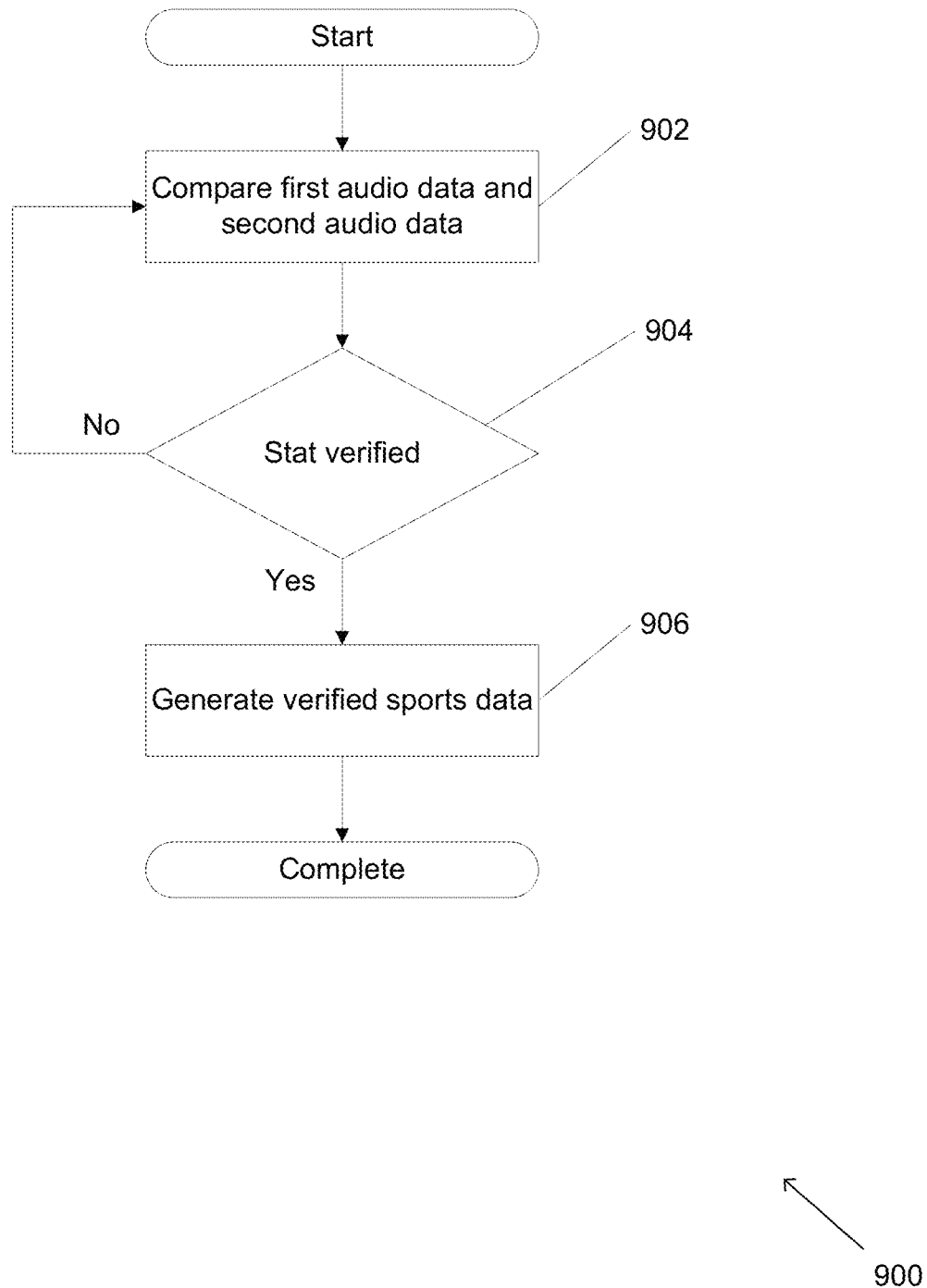
FIG. 9 is a flowchart illustrating a process for generating verified data in accordance with an embodiment of the invention.

A flowchart illustrating a process 900 for generating (812) verified sports data 514 in accordance with an embodiment of the invention is illustrated in FIG. 9. The process 900 may include comparing (902) the first audio data 320 and the second audio data 420 (and/or the first text data 321 with the second text data 421). By comparing the data from the first user and data from the second user, the process 900 may verify (904) any particular stat or event within a sports event. In many embodiments, the first audio data 320 and the second audio data 420 may be compared (902) for a match and/or corroboration of a particular stat. For example, the first audio data 320 may include information that player wearing jersey #1 scored a three-point basket. Further, the second audio data 420 may include information that player wearing jersey #1 scored a three-point basket. Thus, the process 900 may conclude that the stat (i.e., that the player wearing jersey #1 scored a three-point basket) is verified. However, if the second audio data 420 includes information that the player wearing jersey #1 scored a two-point basket, then the first audio data 320 and the second audio data 420 do not match (i.e. are in conflict). In some embodiments, based on the lack of information (e.g., if the second audio data 420 did not include information regarding whether the player wearing jersey #1 scored a three-point basket), the process 900 may determine (904) that the stat is not verified. However, in some embodiments, the lack of information may be used to verify (904) a stat. For example, based on the fact that the second audio data 420 did not include information regarding whether the player wearing jersey #1 scored a three-point basket, the process 900 may determine (904) that the stat is verified. In many embodiments, the process may determine (904) that a stat is verified based on corroboration. For example, the first audio data 320 may include information that player wearing jersey #1 scored a three-point basket. Further, the second audio data 420 may include information that player wearing jersey #1 scored a basket. In this example, the process 900 may determine (904) that the stat is verified since the second audio data 420 corroborates the first audio data 320 regarding whether player wearing jersey #1 scored a three-point basket. In many embodiments, the level of corroboration and/or matching may be adjusted and/or changed using various processes including, but not limited to, manual input, machine learning, etc.

In further reference to FIG. 9, by verifying (904), if there is a conflict in the data, the server 118 may generate verified sports data 514 with varying levels of confidence. In many embodiments, if the stat is not verified (904), the process 900 may return to comparing first audio data 320 and the second audio data 420 (and/or the first text data 321 and the second text data 421). In subsequent comparisons (902), the process 900 may either utilize additional data or compare using updated criteria. If the stat is verified (904), the process 900 may include generating (906) verified sports data 514.

In further reference to FIG. 9, for example, a conflict (i.e., stat is not verified) may occur at a particular time (e.g., at the 10-minute mark) of a sporting event, where the first audio data 320 and/or the first text data 321 reports that a player wearing jersey #1 scored two points, while the second audio data 420 and/or the second text data 421 reports that a player wearing jersey #2 scored two points. If there is such a conflict (904) in the data, the server 118 may compare (902) additional data (e.g., third audio data and/or third text data from a third client device) to verify (904) which of the first user's or the second user's data should be used to generate (906) the verified sports data 514. The more sets of data, from additional users, that the server 118 receives, the more accurate the verified sports data 514 may be. In many embodiments, the process 900 may be an iterative process, including using training data and making predictions in performing various Artificial Intelligence ("AI") processes (e.g., machine learning) for generating verified sports data 514 without using explicit instructions and instead relying on patterns and inferences from the data received from the various users (e.g., first user, second user, third user, etc.). In many embodiments, the process 900 may also utilize other data (e.g., the first user data 322, first location data 324, second user data 422, second location data 424, etc.) in verifying (904) and generating (906) verified sports data 514.

Figure 10:
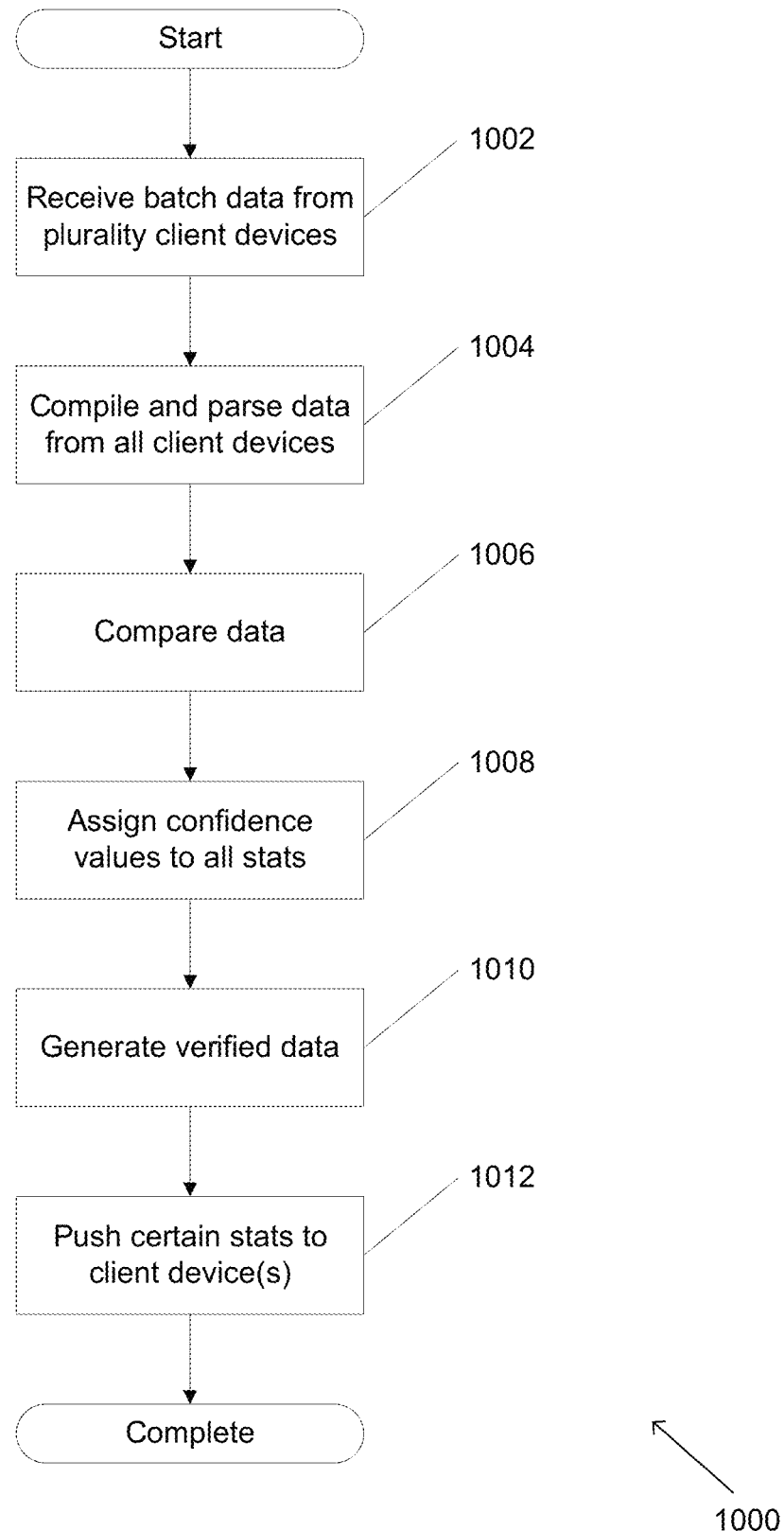
FIG. 10 is a flowchart illustrating another process for providing verified data in accordance with an embodiment of the invention.

Although described above in reference to a first client device and a second client device, any number of client devices may be utilized in accordance with embodiments of the invention. For example, process 900, as described above, may include compiling multiple client data and comparing all client data in one step. A flowchart illustrating another process for providing verified data in accordance with an embodiment of the invention as illustrated in FIG. 10. The process 1000 may include receiving (1002) data such as, but not limited to, audio data and/or text data from a plurality of client devices. For example, a server may receive (1002) captured data from a first client device, a second client device, a third client device, etc. In many embodiments, the captured data from each of the client devices may be batch data that includes the audio data and/or text data captured by each of the client devices, as described above. The process 1000 may also include processing the batch data from the plurality of client devices using various methods such as, but not limited to, compiling and parsing (1004) the data from all client devices, comparing (1006) the data, and/or assigning (1008) confidence values to various stats. In various embodiments, the server may process data from more than two client devices at once. For example, the server may process the captured data from the first client device, the second client device, and the third client device simultaneously. Further, the more client devices that provide data, the higher the assigned confidence values would be for each stat. For example, five client devices providing data would likely result in higher confidence values than if only two client devices provided data. In addition, the process 1000 may include generating (1010) verified data and pushing (1012) certain stats to one or more of the plurality of client devices.

Figure 11:
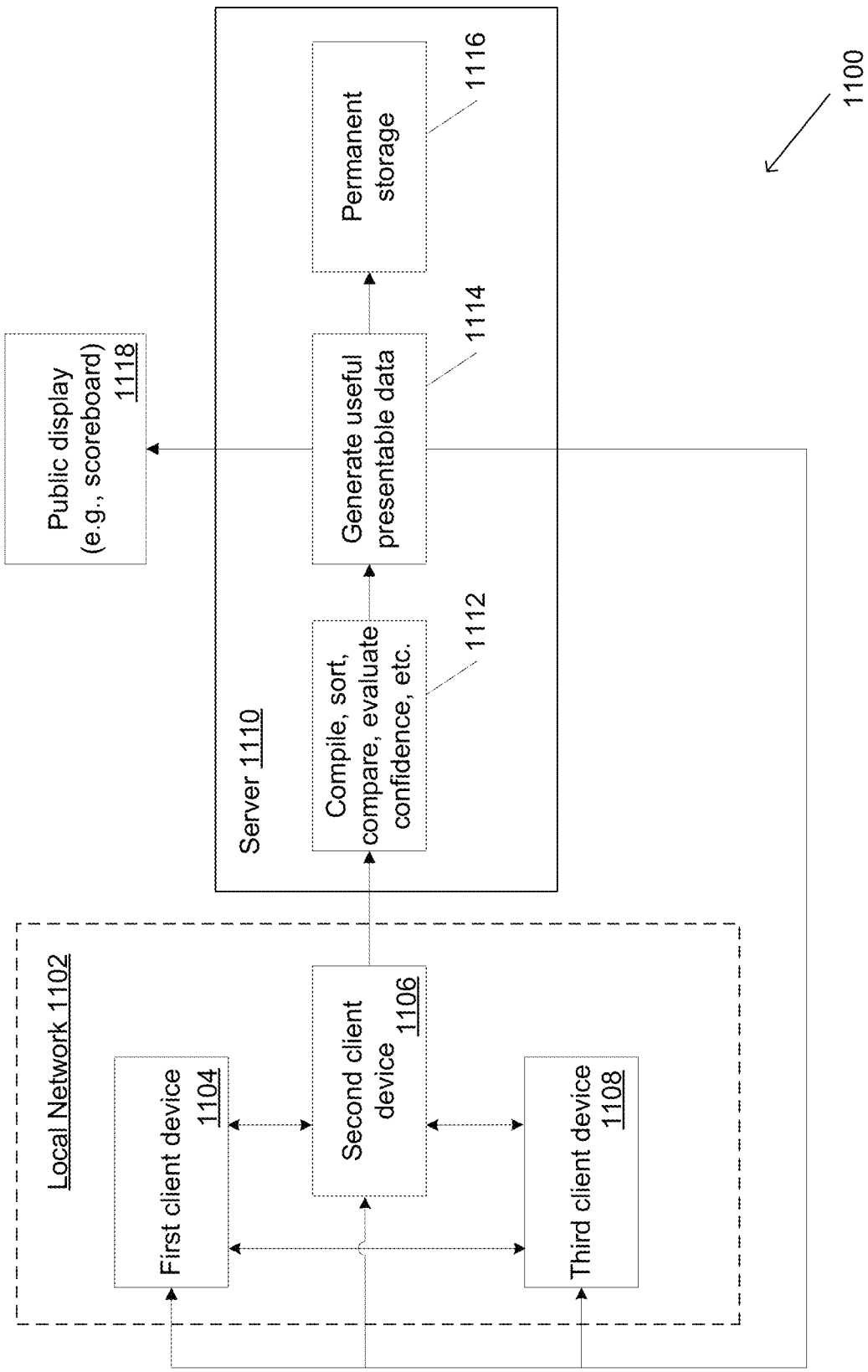
FIG. 11 is a system diagram illustrating pushing verified data to client devices in accordance with an embodiment of the invention.

A system diagram illustrating pushing verified data to client devices in accordance with an embodiment of the invention is shown in FIG. 11. The system 1100 may include a local network 1102 comprising a first client device 1104, a second client device 1106, and a third client device 1108. In many embodiments, the client devices (e.g., the first client device 1104, the second client device 1106, and the third client device 1108) connecting to each other may form the local network 1102. In several embodiments, the local network 1102 may allow for sharing real-time data between the client devices 1104, 1106, 1008. For example, in some embodiments, the first client device 1104 and the third client device 1108 may transmit captured data (e.g., audio and/or text data) to the second client device 1106. In many embodiments, the second client device 1106 may also capture its own audio and/or text data, as described above. In various embodiments, one of the client devices (e.g., the second client device 1106) may transmit the captured data from all of the client devices (e.g., from the first client device 1104, the second client device 1106, and the third client device 1108) to a server 1110. As described above, the server 1110 may process (1112) the received data by performing various processes such as, but not limited to, compiling, sorting, comparing, evaluating confidence, etc. of the received captured data. Further, the server 1110 may generate (1114) verified data (e.g., useful presentable data) and push the verified data to a public display (e.g., scoreboard) 1118 and/or to one or more of the client devices 1104, 1106, 1108. In some embodiments, the server 1110 may also store (1116) the verified data in a permanent storage 1116 such as, but not limited to, a local storage device and/or a cloud based storage device.

Although specific crowdsource-based scorekeeping processes and systems are discussed above with respect to FIGS. 8-11, any of a variety of processes and systems as appropriate to the requirements of a specific application may be utilized in accordance with embodiments of the invention. Moreover, while processes are presented as in an order herein, alternative orders of operations may be utilized without departure from the spirit of the invention. While the above description contains many specific embodiments of the invention, these should not be construed as limitations on the scope of the invention, but rather as an example of one embodiment thereof. It is therefore to be understood that the present invention may be practiced otherwise than specifically described, without departing from the scope and spirit of the present invention. Thus, embodiments of the present invention should be considered in all respects as illustrative and not restrictive.

What is claimed is:

1. A method for at least one server for generating verified sports data of a sporting event, the method comprising:

receiving, at the server(s), first audio data captured by a microphone of a first client device;
receiving, at the server(s), second audio data captured by a microphone of a second client device;
synching the first audio data by arranging the first audio data based on at least one parameter;
synching the second audio data by arranging the second audio data based on the at least one parameter; and
generating the verified sports data by comparing, based on the at least one parameter, the first audio data and the second audio data to determine that a stat within the sporting event is verified.

2. The method of claim 1 further comprising processing the first audio data by converting the first audio data to first text data.

3. The method of claim 2 further comprising processing the second audio data by converting the second audio data to second text data.

4. The method of claim 1, wherein the at least one parameter is a timestamp associated with a particular portion of the first audio data and a timestamp associated with a particular portion of the second audio data.

5. The method of claim 4, wherein the timestamp associated with the particular portion of the first audio data corresponds to a relative time that describes action that is occurring within the sporting event, and the timestamp associated with the particular portion of the second audio data corresponds to the relative time that describes the action that is occurring within the sporting event.

6. The method of claim 1, wherein the at least one parameter includes at least one of a team, a player, and a stat of interest.

7. The method of claim 1, wherein determining that the stat is verified when the first audio data matches the second audio data.

8. The method of claim 1 further comprising:
receiving, at the server(s), third audio data captured by a microphone of a third client device;
synching the third audio data by arranging the third audio data based on the at least one parameter; and
generating the verified sports data by comparing, based on the at least one parameter, the first audio data, the second audio data, and the third audio data to determine that the stat within the sporting event is verified.

9. The method of claim 8, wherein the first audio data and the second audio data are in conflict.

10. The method of claim 9, wherein the third audio data matches one of the first audio data and the second audio data, and wherein determining that the stat is verified is based on which of the first audio data and the second audio data is matched to the third audio data.

11. A non-transitory machine readable storage medium storing a program comprising instructions that, when executed by at least one processor of a server, cause the server to perform operations including:
receiving first text data from a first client device;
receiving second text data from a second client device;
synching the first text data by arranging the first text data based on at least one parameter;
synching the second text data by arranging the second text data based on the at least one parameter; and
generating verified sports data by comparing, based on the at least one parameter, the first text data and the second text data to determine that a stat within a sporting event is verified.

12. The non-transitory machine readable storage medium of claim 11 wherein the at least one parameter is a timestamp associated with a particular portion of the first text data and a timestamp associated with a particular portion of the second text data.

13. The non-transitory machine readable storage medium of claim 12 wherein the timestamp associated with the particular portion of the first text data corresponds to a relative time that describes action that is occurring within the sporting event, and the timestamp associated with the particular portion of the second text data corresponds to the relative time that describes the action that is occurring within the sporting event.

14. The non-transitory machine readable storage medium of claim 11 wherein the at least one parameter includes at least one of a team, a player, and a stat of interest.

15. The non-transitory machine readable storage medium of claim 11 further comprising instructions that, when executed by the at least one processor, further cause the server to determine that the stat is verified when the first text data matches the second text data.

16. The non-transitory machine readable storage medium of claim 11 further comprising instructions that, when executed by the at least one processor, further cause the server to determine that the stat is in conflict.

17. The non-transitory machine readable storage medium of claim 16 further comprising instructions that, when executed by the at least one processor, further cause the server to compare the first text data and the second text data using an iterative process.

18. The non-transitory machine readable storage medium of claim 17 wherein the iterative process comprises using training data and making at least one prediction.

19. The non-transitory machine readable storage medium of claim 11 further comprising instructions that, when executed by the at least one processor, further cause the server to:
receive third text data from a third client device;
synch the third text data by arranging the third text data based on the at least one parameter; and
generate the verified sports data by comparing, based on the at least one parameter, the first text data, the second text data, and the third text data to determine that the stat within the sporting event is verified.

20. The non-transitory machine readable storage medium of claim 11 further comprising instructions that, when executed by the at least one processor, further cause the server to determine that the first text data and the second text data are in conflict, and determine that the stat is verified when the third text data matches one of the first text data and the second text data.

* * * * *